US010758027B2

(12) United States Patent
Skidmore et al.

(10) Patent No.: US 10,758,027 B2
(45) Date of Patent: Sep. 1, 2020

(54) FLEXIBLE TILTING APPLICATOR ATTACHMENT (71) Applicant: L'Oréal, Paris (FR)

(72) Inventors: Joseph Eric Skidmore, Issaquah, WA (US); Gerald Keith Brewer, Redmond, WA (US)

(73) Assignee: L'Oréal, Paris (FR)

( * ) Notice: Subject to any disclaimer, the term of this patent is extended or adjusted under 35 U.S.C. 154(b) by 337 days.

(21) Appl. No.: 15/940,867

(22) Filed: Mar. 29, 2018

(65) Prior Publication Data
US 2019/0298036 A1 Oct. 3, 2019

(51) Int. Cl.
A45D 40/26 (2006.01)
A45D 40/28 (2006.01)
(Continued)

(52) U.S. Cl.
CPC ........... *A45D 40/262* (2013.01); *A45D 34/04* (2013.01); *A45D 34/041* (2013.01); *A45D 40/28* (2013.01);
(Continued)

(58) Field of Classification Search
CPC ...... A45D 40/24–28; A45D 34/04–048; A61H 15/00; A61H 15/0078; A61H 15/0085; A61H 15/0092; A61H 7/00–008
See application file for complete search history.

(56) References Cited

U.S. PATENT DOCUMENTS 2,011,471 A 8/1935 Casagrande et al.
2,641,256 A 6/1953 Schmidt
(Continued)

FOREIGN PATENT DOCUMENTS

CN 206214388 U 6/2017
DE 196 01 779 A1 7/1997
(Continued)

OTHER PUBLICATIONS

Tiest, Wouter M. Bergmann et al., "Tactile perception of thermal diffusivity," Attention, Perception, & Psychophysics, 2009, 71 (3), 481-489, Utrecht University, Utrecht, The Netherlands, 9 pages.
(Continued)

*Primary Examiner* — Bradley H Philips
*Assistant Examiner* — Vincent D Hoang
(74) *Attorney, Agent, or Firm* — Christensen O'Connor Johnson Kindness PLLC (57) ABSTRACT Flexible tilting skin contacting devices are disclosed herein. In some embodiments, an apparatus includes an applicator that is to contact skin surface, and a base connectable or detachable from the applicator. The applicator comprises first, second, and third portions. The second portion is disposed between and connected to the first and third portions along the rotation axis of the applicator. The first portion comprises an outwardly curved disc with at least one tip protruding from a major surface of the first portion, the second portion comprises an elastomeric material configured to flex proportionately in response to respective contact pressure on the at least one tip with the skin surface during rotation of the first portion, and the first portion is to tilt in a plane different from a rotation plane associated with the rotation axis in accordance with the flexing of the second portion.

20 Claims, 12 Drawing Sheets (51) Int. Cl.
  *A45D 34/04* (2006.01)
  *A61H 15/00* (2006.01)
  *A61H 7/00* (2006.01)
  *A46B 13/00* (2006.01)
  *A46B 13/02* (2006.01)
  *G01B 7/31* (2006.01)

(52) U.S. Cl.
  CPC ............ *A46B 13/008* (2013.01); *A46B 13/02* (2013.01); *A61H 7/005* (2013.01); *A61H 15/00* (2013.01); *A61H 15/0085* (2013.01); *G01B 7/31* (2013.01); *A45D 2200/15* (2013.01); *A45D 2200/155* (2013.01); *A45D 2200/207* (2013.01); *A46B 2200/1006* (2013.01); *A46B 2200/1046* (2013.01); *A61H 2015/0064* (2013.01); *A61H 2205/022* (2013.01)

(56) References Cited

U.S. PATENT DOCUMENTS

| | | | |
|---|---|---|---|
| 3,077,878 A | 2/1963 | Barlard-Cougan | |
| 3,385,290 A | 5/1968 | Schmidt | |
| 4,432,355 A | 2/1984 | Delluc | |
| 4,492,223 A | 1/1985 | Burke | |
| 7,137,960 B2 | 11/2006 | Tien | |
| 7,481,783 B1 | 1/2009 | Kelley | |
| 7,896,824 B2 | 3/2011 | Gueret | |
| 8,292,915 B2 | 10/2012 | Akcasu | |
| 2004/0231078 A1 | 11/2004 | Braun | |
| 2006/0009719 A1 | 1/2006 | LaJoie et al. | |
| 2006/0276732 A1 | 12/2006 | Chen | |
| 2013/0060176 A1* | 3/2013 | Nichols | A61H 23/02 601/137 |
| 2014/0135798 A1* | 5/2014 | David | A61H 7/005 606/131 |
| 2014/0288473 A1 | 9/2014 | Matsushita | |
| 2014/0323993 A1* | 10/2014 | Wilcox | A61M 35/003 604/290 |
| 2015/0141884 A1* | 5/2015 | Thiebaut | A61H 7/005 601/112 |
| 2016/0256348 A1* | 9/2016 | Giraud | A61H 15/0085 |
| 2017/0073050 A1* | 3/2017 | Smith | E04H 4/1618 |
| 2017/0189670 A1* | 7/2017 | Brunson | A61N 1/0472 |

FOREIGN PATENT DOCUMENTS

| | | |
|---|---|---|
| FR | 2 964 307 A1 | 3/2012 |
| WO | 2008113139 A1 | 9/2008 |

OTHER PUBLICATIONS

International Search Report dated Jun. 3, 2019, issued in corresponding International Application No. PCT/US2019/023893, filed Mar. 25, 2019, 15 pages.

* cited by examiner

FLEXIBLE TILTING APPLICATOR ATTACHMENT

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an apparatus comprises an applicator that is to contact skin surface, and a base connectable or detachable from the applicator. If the applicator is connected to the base, the base is to cause the applicator to rotate about a rotation axis in a particular oscillation pattern. The applicator comprises first, second, and third portions. The second portion is disposed between and connected to the first and third portions along the rotation axis of the applicator. The first portion comprises an outwardly curved disc with at least one tip protruding from a major surface of the first portion, the second portion comprises an elastomeric material configured to flex proportionately in response to respective contact pressure on the at least one tip with the skin surface during rotation of the first portion, and the first portion is to tilt in a plane different from a rotation plane associated with the rotation axis in accordance with the flexing of the second portion.

In some embodiments, an apparatus comprises a first, second, and third portions. The first portion comprises a base and at least one tip protruding from a first major surface of the base. The second portion comprises an elastomeric material configured to deform in response to a particular amount of contact pressure between the at least one tip and skin surface. The third portion is configured to be detachably connectable to a device, wherein the device is to cause the first, second, and third portions to oscillate about a rotation axis perpendicular to a second major surface of the third portion. The second portion is disposed between and connected to the first and third portions, and the first portion is configured to tilt in a plane different from a rotation plane associated with the rotation axis based on the deformation of the second portion.

In some embodiments a method comprises causing to rotate a skin surface contacting unit about a rotation axis in accordance with a particular oscillation pattern; in response to a contact pressure between a skin surface and at least a first portion of the skin surface contacting unit exceeding a threshold, deforming a second portion of the skin surface contacting applicator; and, while the skin surface contacting unit is in rotation about the rotation axis, changing an angle of the first portion of the skin surface contacting unit based on the deformation of the second portion.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Embodiments of apparatuses and methods related to flexible tilting skin contacting devices are described. In embodiments, a system includes an applicator that is to contact skin surface, and a base connectable or detachable from the applicator. If the applicator is connected to the base, the base is to cause the applicator to rotate about a rotation axis in a particular oscillation pattern. The applicator comprises first, second, and third portions, and the second portion is disposed between and connected to the first and third portions along the rotation axis of the applicator. The first portion comprises an outwardly curved disc with at least one tip protruding from a major surface of the first portion. The second portion comprises an elastomeric material configured to flex proportionately in response to respective contact pressure on the at least one tip with the skin surface during rotation of the first portion. The first portion is to tilt in a plane different from a rotation plane associated with the rotation axis in accordance with the flexing of the second portion. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C).

Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Mechanized devices may be used to improve application of skin cleansers, treatments, or other products to the skin. Because mechanized devices may provide faster application speeds and/or include portions, such as brush bristles, that are smaller than human fingers, applied items may be better distributed on the surface of the skin and/or penetrate deeper into the skin (e.g., into the pores) than otherwise may be possible with manual application.

Since skin may have a plurality of needs, particularly skin and/or anatomical structures underneath skin at different parts of the body, it may be beneficial to use more than one mechanized device to meet the different needs. Having a dedicated device for each of the different needs, however, may be costly, storage prohibitive, and/or increase device maintenance time (e.g., charging each device). It would be beneficial to extend functionalities of a device without significantly increasing cost, size (e.g., goes to storage requirements), device maintenance, device complexity, and/or the like.

Figure 1:
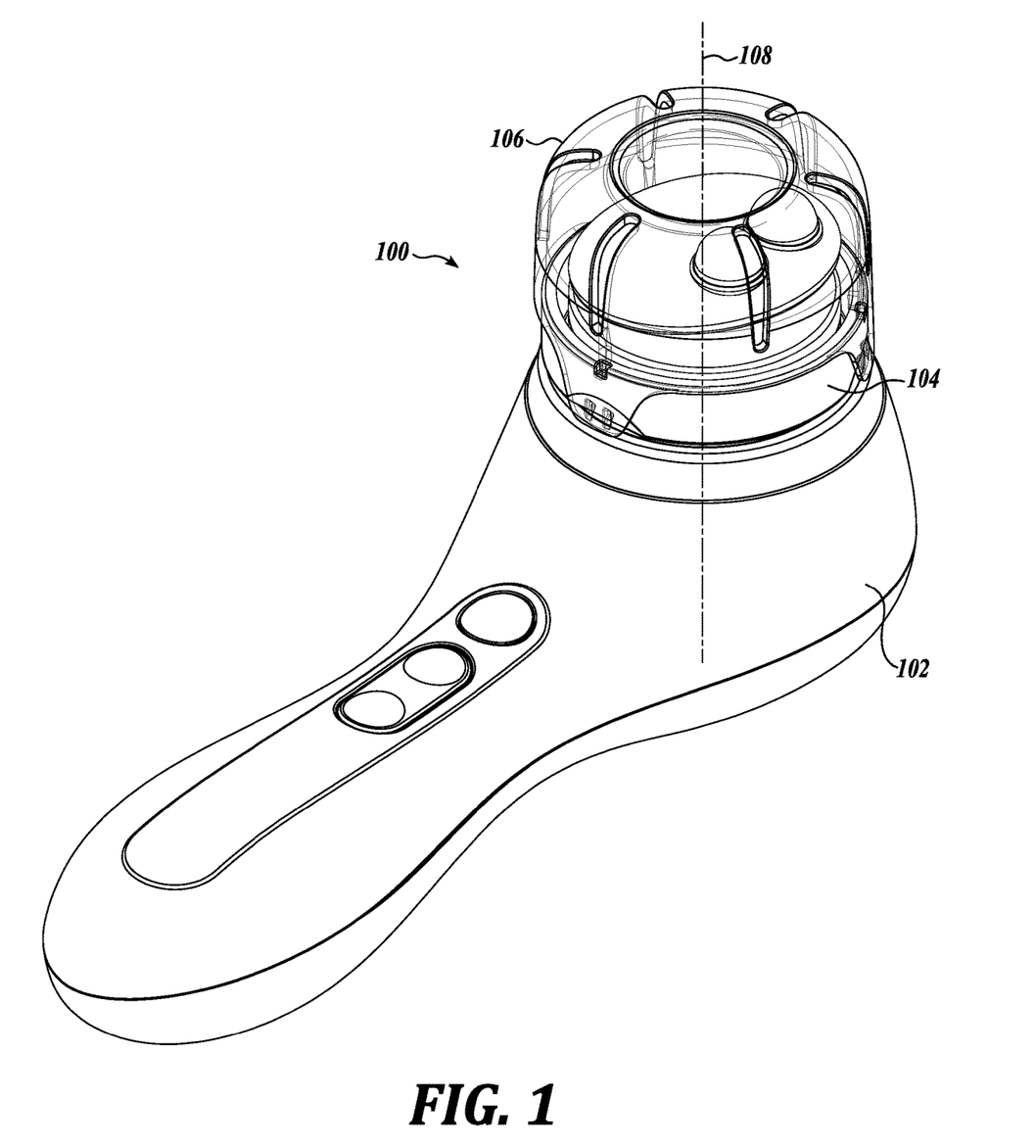
FIG. 1 depicts a perspective view of an example device, according to some embodiments.

FIG. 1 depicts a perspective view of an example device 100, according to some embodiments. Device 100 may be configured to facilitate application, stimulation, rejuvenation, and/or other actions to a user's skin and/or structures surrounding the skin via contact between device 100 and the user's skin. Device 100 may comprise an outlet or battery powered device, and may have an inactive/off state and one or more active/on states. Device 100 may include, without limitation, a base 102, an applicator attachment 104, and a lid 106. Applicator attachment 104 may attach to base 102, and the lid 106 may detachably connect to the applicator attachment 104.

Base 102 may be configured to include an attachment or mating portion that is compatible with a corresponding attachment or mating portion included in the applicator attachment 104. Such attachment/mating portions may be configured to permit the applicator attachment 104 to be attached and detached one or more times from the base 102. One or more other types of applicator attachments may also attach to and detach from the base 102. A plurality of different applicator attachment types may be interchangeably used with the base 102. Base 102 may house the mechanical components (e.g., motors, actuators), electrical components (e.g., circuits, switches), power components (e.g., battery), controls (e.g., display, user interface), and/or the like for the device 100. Base 102 may also be referred to as a housing, handle, docking station, or the like.

In some embodiments, base 102 may be configured to cause the applicator attachment 104 to rotate or oscillate about an axis 108 in one or both of a clockwise and counterclockwise direction. The rotation may be periodic or aperiodic, equal to or less than 360 degrees in one direction before changing direction, for a predetermined length of time, follow a predetermined rotation pattern, at one or more speeds, at constant or variable speeds, and/or the like. For instance, base 102 may operate at approximately 75 Hertz (Hz). In some embodiments, one or more particular rotation patterns may be associated with respective applicator attachment of a plurality of different applicator attachment types. If a particular applicator attachment is attached to the base 102, for instance, upon detection and identification of the applicator attachment 104, actuation of the base 102 (at a particular setting such as a low setting) causes the base 102 to move the applicator attachment 104 in accordance with a particular rotation pattern associated with the applicator attachment 104 for the particular setting.

As will be described in detail below, applicator attachment 104 may be configured, in some embodiments, for use around the eye area, orbital socket, and/or other areas of the body. Applicator attachment 104 may be used to massage, stimulate (circulation, fluid flow), sooth, apply products, and/or the like around one or more areas of the body without skin tugging, maintaining consistent contact, undue pressure, and/or automatic adjustment to surface contour changes. Applicator attachment 104 may also be referred to as an applicator, attachment, head, massager, and/or the like. In some embodiments, applicator attachment 104 may be disposed between the base 102 and lid 106. Lid 106 may be removed from device 100 during use of the applicator attachment 104 on the user.

Figure 2A:
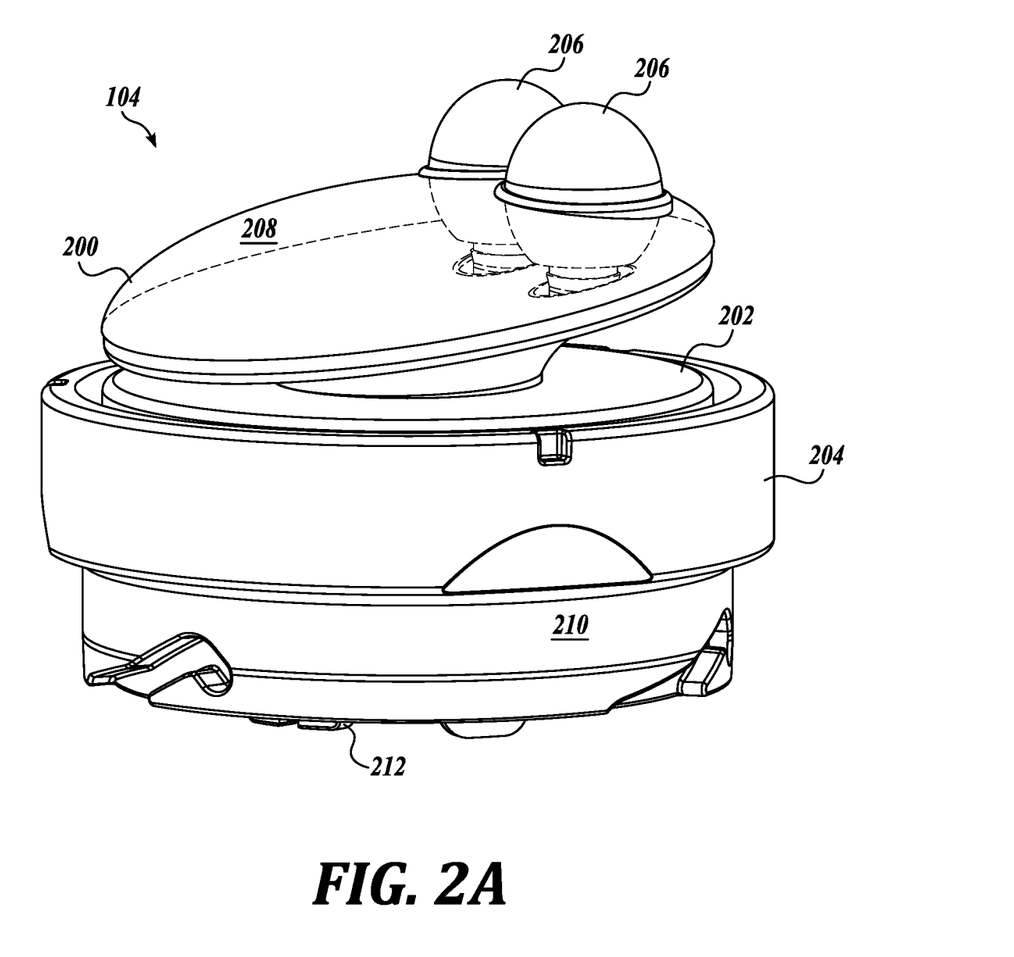
FIGS. 2A-2B depict perspective views of examples of an applicator attachment, according to some embodiments.
Figure 2B:
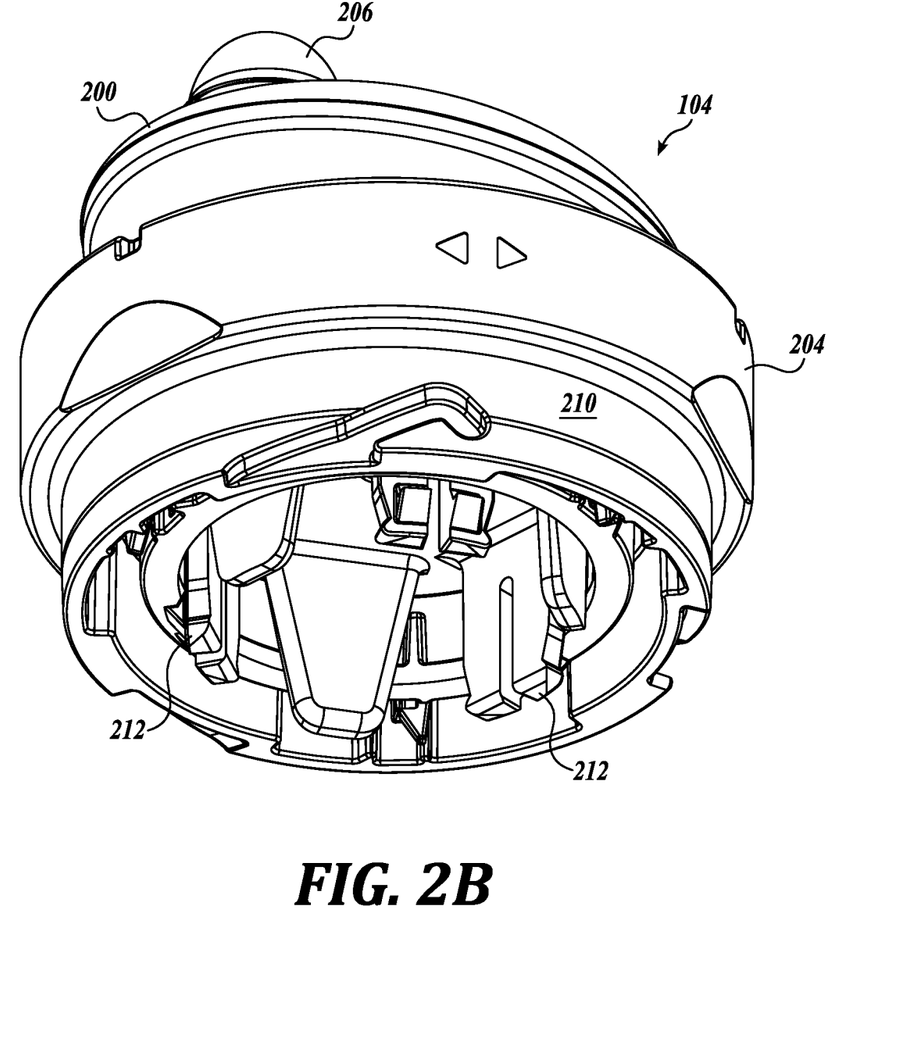

FIGS. 2A-2B depict perspective views of examples of the applicator attachment 104, according to some embodiments. As shown in FIG. 2A, applicator attachment 104 may include, without limitation, a first portion 200, a second portion 202, and a third portion 204.

First portion 200, also referred to as a top portion, may be configured to contact a user during use of the device 100. First portion 200 may include, without limitation, one or more tips 206 connected to or seated within a tip base 208. Tip base 208 may comprise a circular disc having a non-constant thickness. A major surface of the top base 208 (e.g., top surface) may be domed or curve outward, such that tip base 208 may be thickest in the middle portion and thinnest at the edges.

Tips 206 may protrude or extend past a major surface (e.g., top surface) of the tip base 208. Tips 206 may be located closer to the edge than the middle of the top base 208. Each of the tips 206 may be located proximate to each other rather than, for example, distributed throughout the major surface of the top base 208. In some embodiments, at least a portion of the first portion 200—the one or more tips 206—may contact the eye area (or other part of the user). Tips 206 may also be referred to as protrusions, message tips, and the like.

One side of the second portion 202 may connect with the other major surface of the tip base 208 (the major surface opposite the major surface from which the tips 206 protrude), and an opposing side of the second portion 202 may include tabs 212 (see FIG. 2B). Second portion 202 may comprise the interface between the user-contacting first portion 200 and the base 102-contacting third portion 204. Second portion 202 may also be referred to as a mid portion.

Figure 3:
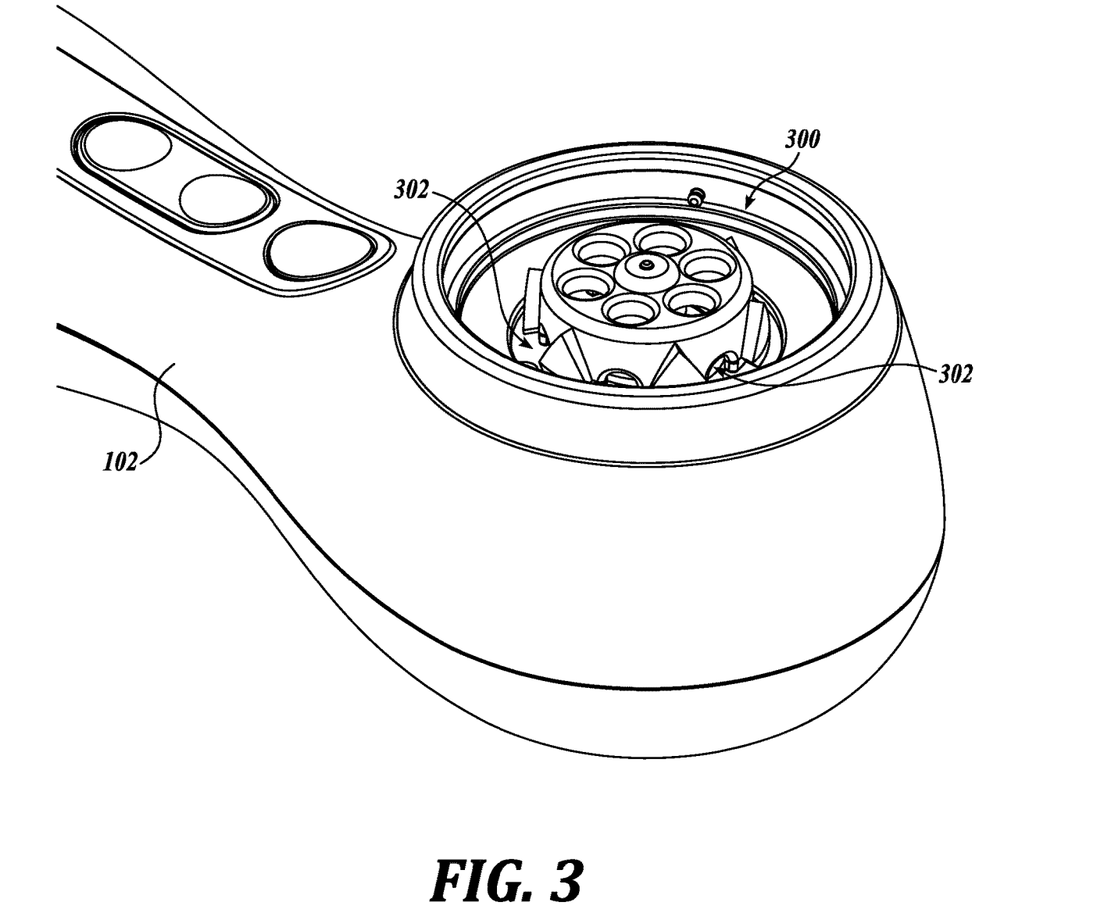
FIG. 3 depicts a perspective view of an example of a base of the device of FIG. 1, according to some embodiments.

Third portion 204 may comprise an attachment ring or mechanism configured to be disposed around and connect with the second portion 202. Tabs 212 of second portion 202 may extend through the interior space of the third portion 204. When applicator attachment 104 is inserted into the base 102, an insertion ring 210 of the third portion 204 may be provided into space 300 of base 102 and secure to the base 102, and tabs 212 may be configured to connect with corresponding insertion locations 302 of base 102 (see FIG. 3). Rotational force applied to the tabs 212, by the base 102, in turn, may cause the tips 206 to rotate via rotation of the second portion 202 and tip base 208.

Figure 4:
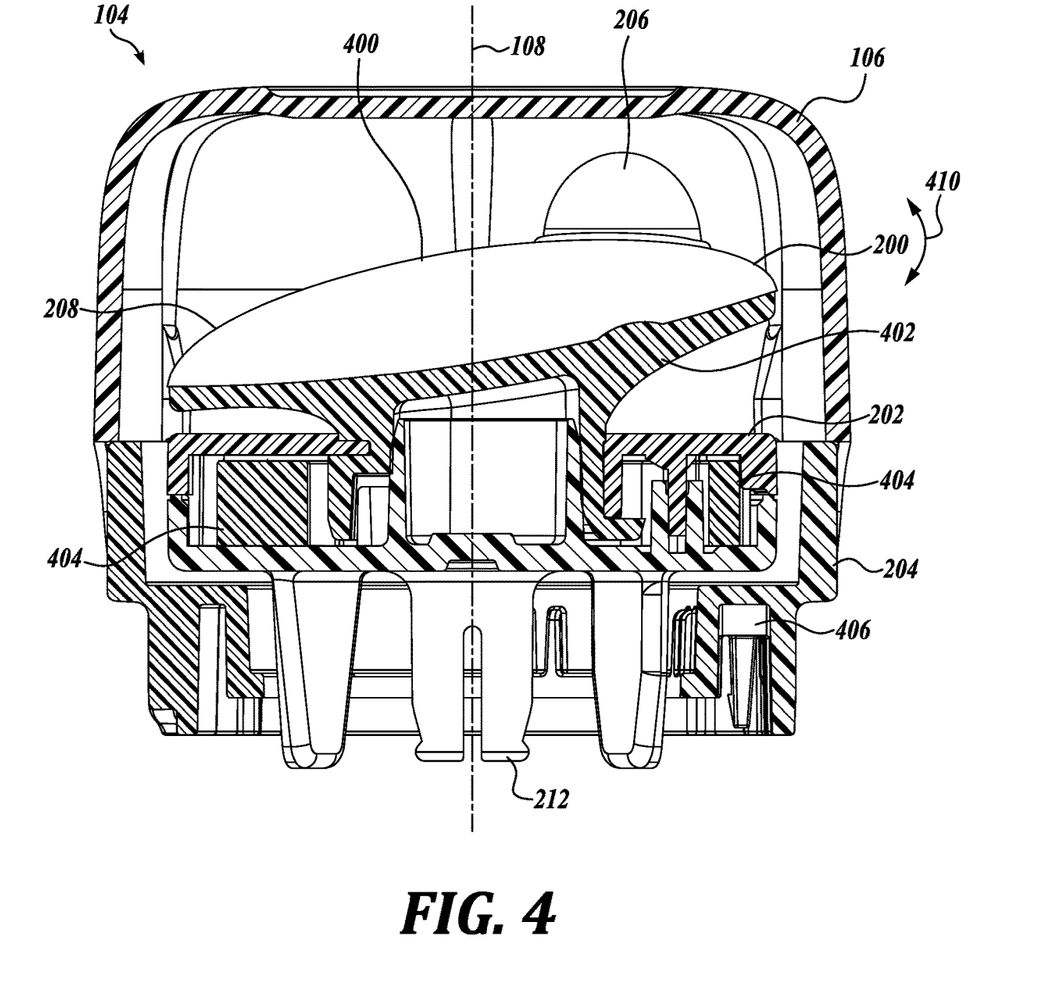
FIG. 4 depicts a cross-sectional view of an applicator attachment and lid, according to some embodiments.

FIG. 4 depicts a cross-sectional view of the applicator attachment 104 and lid 106, according to some embodiments. In some embodiments, tip base 208 of first portion 200 may comprise a top portion 400 and a bottom portion 402. Tips 206 may extend past a top side of the top portion 400. A bottom side of the top portion 400, opposite to the top side of the top portion 400, may couple to a top side of the bottom portion 402. The bottom side of the bottom portion 402, opposite to the top side of the bottom portion 402, may be embedded within the second portion 202.

In some embodiments, tips 206 may comprise an ellipsoid, spherical, near spherical, or other shape having a curved top. A part of each of the tips 206 may be embedded within and extend through the tip base 208 and may also attach to the top side of the bottom portion 402. Tips 206 may comprise aluminum, aluminum alloy, metallic material, or the like. Tips 206 may comprise material having a thermal diffusivity in the range of 50 to 100 millimeter square per second ($mm^2/s$). Tips 206 may comprise material having low heat capacity and high thermal conductivity, which in combination may exhibit high thermal diffusivity. Due to thermal diffusivity properties associated with tips 206, tips 206 may feel cool or cold to the skin.

Figure 5A:
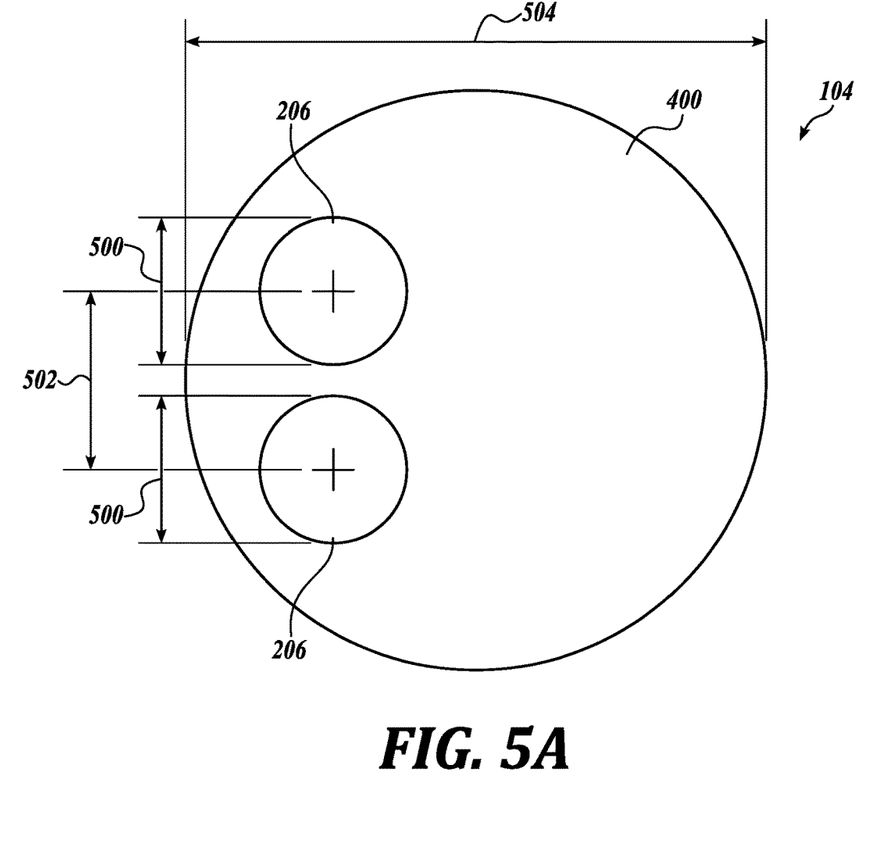
FIG. 5A depicts a top view of the applicator attachment, according to some embodiments.

As shown in FIG. 5A, which depicts a top view of the applicator attachment 104 according to some embodiments, a diameter 500 of each of the tips 206 may be approximately 12.7 mm and a distance 502 between the centers of tips 206 may be approximately 13.28 mm. Tips 206 may be adjacent to each other and separated by a gap of approximately 0.58 mm.

Figure 5B:
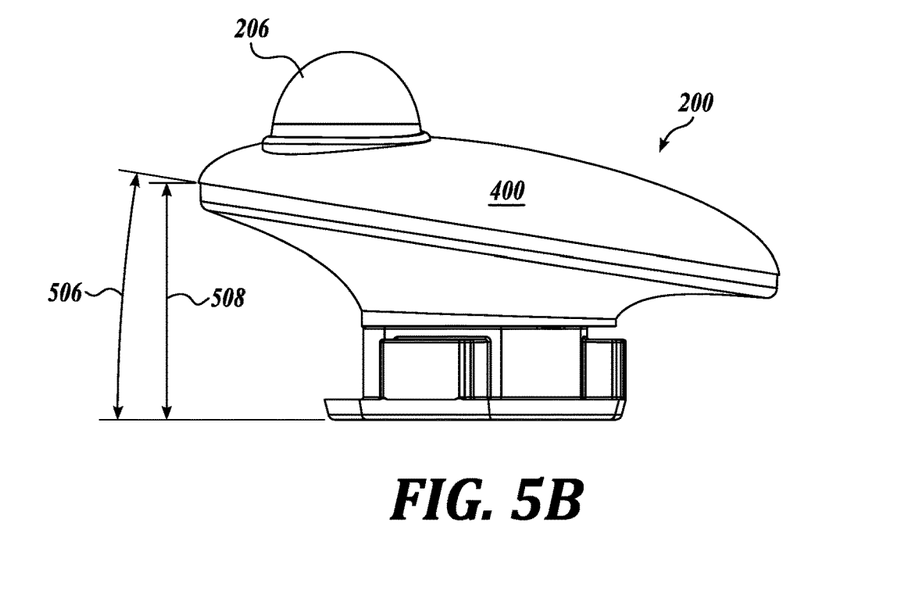
FIG. 5B depicts a side view of the first portion of the applicator attachment, according to some embodiments.

Top portion 400 of first portion 200 may comprise a circular shape with respect to a top view, as shown in FIG. 5A. The circular top may have a diameter 504 of approximately 43.18 mm. In some embodiments, the profile or side view of the top portion 400 may be ellipsoidal or a curved disc in shape. As shown in FIGS. 4 and 5B, top and bottom of top portion 400 may curve outward and the edges may taper to a thinner thickness than the center. Top portion 400 may comprise a hard plastic material, co-polyester, or the like.

Bottom portion 402 of first portion 200 may comprise a base for the top portion 400. Top and bottom portions 400, 402 in combination may resemble a mushroom shape, with the "head" of the mushroom (e.g., top portion 400 and a portion of the bottom portion 402) configured to be tilted at an angle that is not parallel with a horizontal plane and the "stem" of the mushroom (e.g., portion of the bottom portion 402) configured to resemble a hollowed out base. In some embodiments, a tilt angle 506 associated with the "head" of the mushroom may be approximately 9 degrees, as shown in FIG. 5B, which depicts a side view of the first portion 200 according to some embodiments.

Bottom portion 402 may be configured to flex or indent to a certain extent in response to varying contact pressure between the tips 206 and the user's skin. As the tips 206 traverse around the rim of the eye area or the orbital bone, different facial contours may be encountered—the side of the nose, eyebrow, the delicate under eye area, and the like. In order to automatically maintain contact and/or maintain relatively constant pressure between the tips 206 and the user's skin, at least bottom portion 402 may be configured to be flexible. Bottom portion 402 may be configured to flex, deform, indent, bend, or the like in a direction such as, but not limited to, a direction 410, as shown in FIG. 4. In some embodiments, bottom portion 402 may comprise elastomeric or flexible material having a durometer in the range of 25 to 45 Shore A. For instance, bottom portion 402 may comprise rubber material.

While bottom portion 402 may comprise a flexible material, bottom portion 402 may also be configured to be rigid enough to support top portion 400 and tips 206, prevent undesirable wobbling of the first portion 200 when rotating about axis 108, maintain top portion 400 and tips 206 at a certain tilt or orientation, maintain a gap or spacing between the first and second portions 200, 202 so as to permit first portion 200 to rotate about axis 108, and/or the like. In some embodiments, bottom portion 402 may be configured to provide top portion 400 and tips 206 at a particular tilt or orientation relative to a horizontal plane. For example, the "mushroom head" of the first portion 200 (e.g., the top surface of the bottom portion 402) may be oriented or tilted at an angle 506 of approximately 9.1 degrees (see FIG. 5B). A height 508 of the "mushroom head" may be approximately 17.5 mm from the highest/furthest edge to the bottom of the bottom portion 402. During use of the applicator attachment 104 on a user, the tilt of the "mushroom head" may change due to variable flexing of the bottom portion 402 as described above, which may cause the height 508 to vary up to approximately 5 mm.

Top and bottom portions 400, 402 may comprise different materials from each other. Top portion 400 may comprise a harder material than bottom portion 402.

Figure 6:
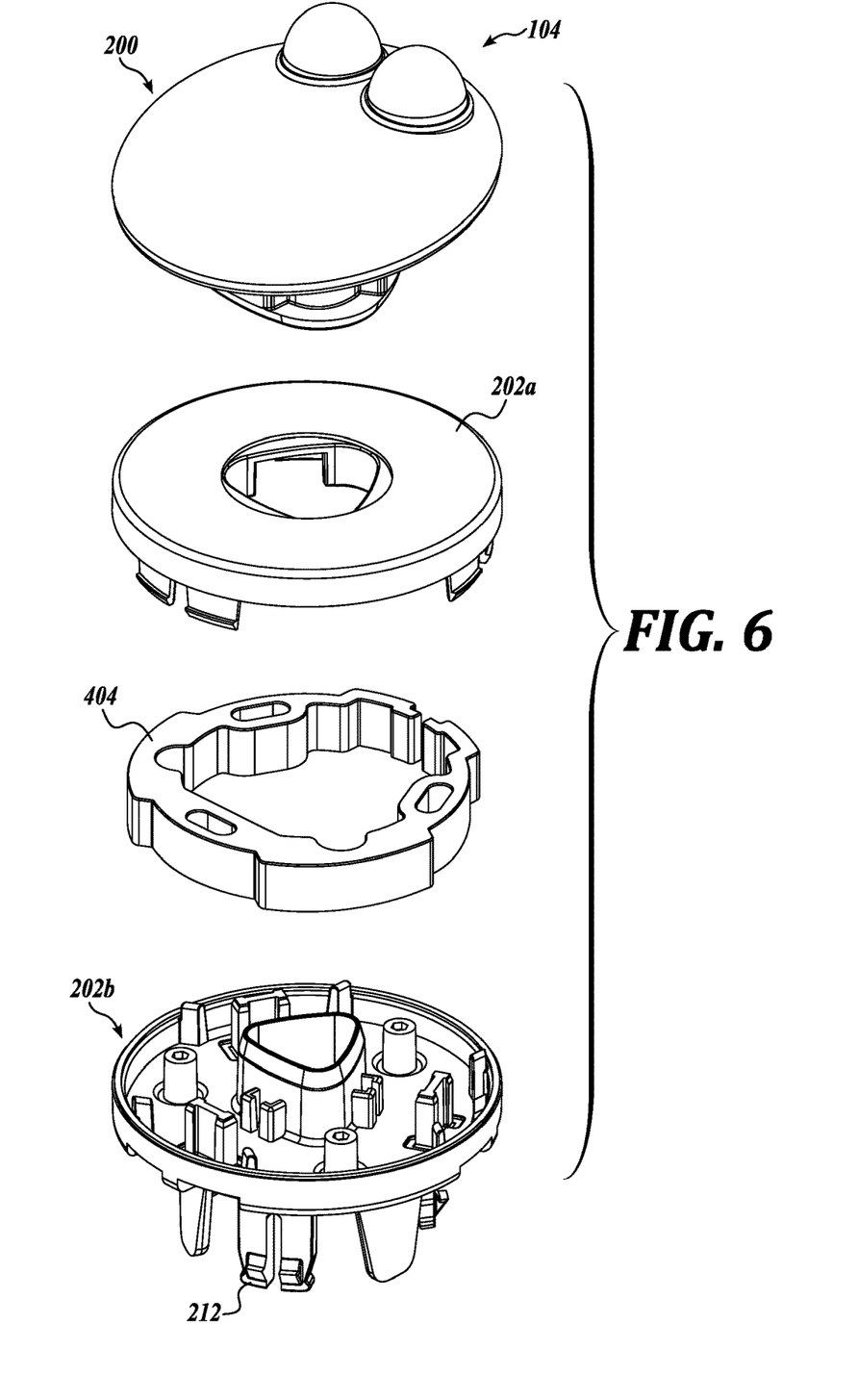
FIG. 6 depicts an exploded perspective view of the applicator attachment, according to some embodiments.

In some embodiments, an inertial mass 404 may be included in the second portion 202, as shown in FIGS. 4 and 6. Inertial mass 404 may be disposed between a section 202*a* of the second portion 202 and a section 202*b* of the second portion 202, as shown in FIG. 6.

FIG. 6 depicts an exploded perspective view of the applicator attachment 104, according to some embodiments. Inertial mass 404, also referred to as a mass ring or weight, may be configured to facilitate operation of the applicator attachment 104 at or about 75 Hz and/or a resonant frequency associated with the applicator attachment 104. The inertial mass 404 contributes to applicator attachment 104 having a higher mass than other attachments to the base 102, and correspondingly, a higher moment of inertia than other attachments. The higher moment of inertia, in turn, causes oscillation to occur at a lower frequency, such as 75 Hz, than otherwise would occur (e.g., around 170 to 175 Hz). In this manner, a plurality of different types of applicator attachments may be used with the same base 102. In some embodiments, inertial mass 404 may be 39.6 gram (g)±0.50 g. Inertial mass 404 may comprise a ring like structure that is close ended (e.g., extends 360 degrees) or open ended (e.g., extends less than 360 degrees such as 350 degrees). Alternatively, other shapes may be implemented for the inertial mass 404 such as a rectilinear shape, an oval shape, a plurality of distributed masses, and/or the like.

In some embodiments, base 102 may be configured to automatically identify the applicator attachment 104 or type of applicator attachment that is the applicator attachment 104 based on a type identifier mechanism 406 included in the third portion 204 (see FIG. 4). Type identifier mechanism 406 may comprise any of a variety of type identifiers such as, but not limited to, a radio frequency identifier (RFID) tag, a magnet, a magnet or other detectable item located in a particular location from among a plurality of pre-defined locations within the third portion 204, a microchip, and/or the like. When the applicator attachment 104 is attached to the base 102, base 102 may be configured to automatically detect the type identifier mechanism 406, and in response to the detection, access a look up table or the like which specifies one or more operating parameters (oscillation frequency, oscillation pattern, timing sequence, etc.), user interface capabilities, and/or the like associated with the applicator attachment type detected. For instance, detection of the particular type identifier mechanism 406 included in the third portion 204 may identify that the oscillation frequency is to be at or around 75 Hz during operation of the applicator attachment 104.

Figure 7:
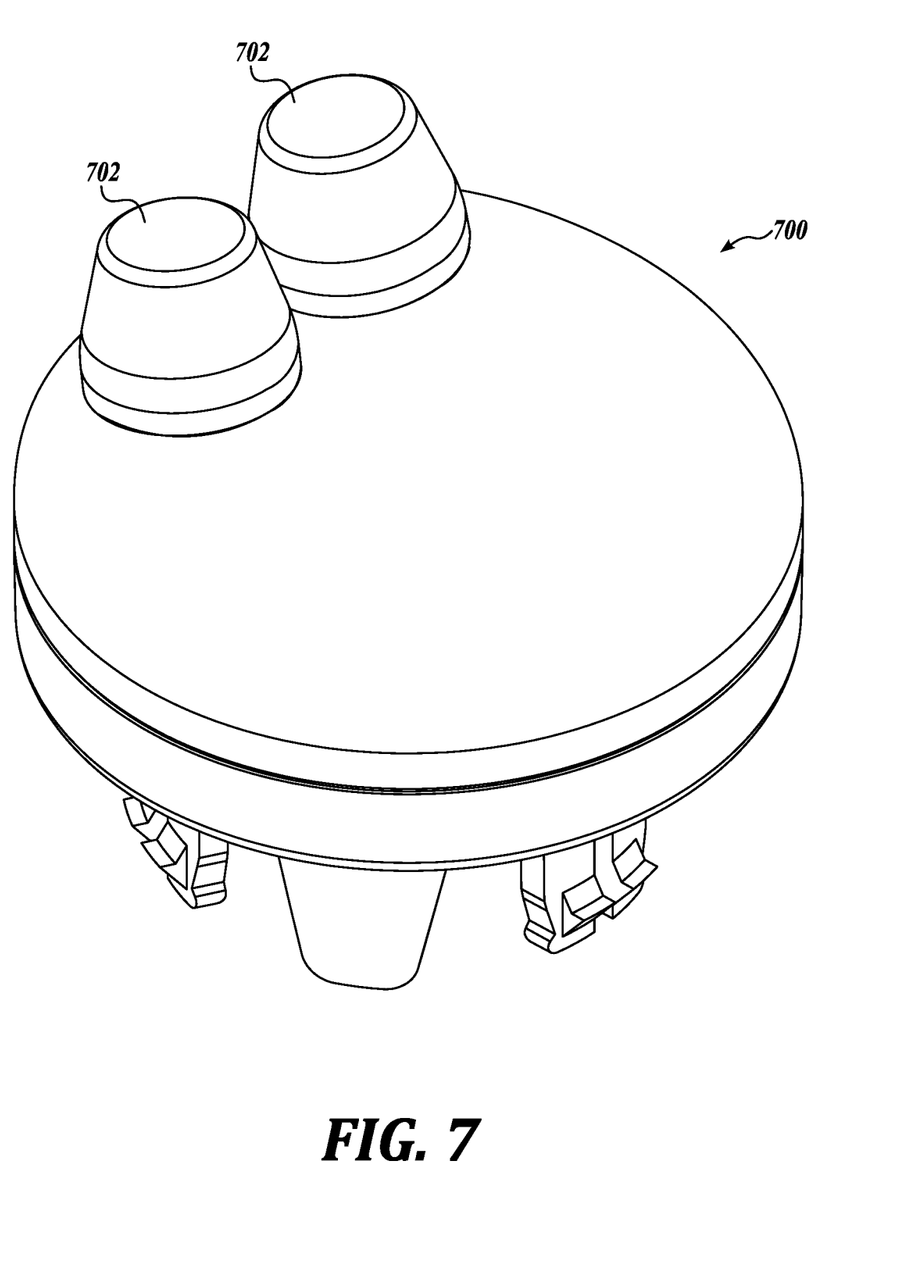
FIG. 7 depicts a perspective view of alternative tips included in an applicator attachment, according to some embodiments.

FIG. 7 depicts a perspective view of alternative tips 702 included in an applicator attachment 700, according to some embodiments. Applicator attachment 700 may be similar to applicator attachment 104 except that tips 702 may be included instead of tips 206. In some embodiments, tips 702 may be similar to tips 206 except tips 702 may have a different shape and/or material than tips 206. Each of tips 702 may comprise a conical shape with a flatten top, a spherical or ovoid shape with flatten top, and/or the like. Tips 702 may comprise silicone or other flexible materials. Tips 702 and 206 may also be referred to as protrusions, fingers, nubs, massage tips, and/or the like. In alternative embodiments, less or more than two tips may be included in the applicator attachment 104 and/or 700.

Figure 8:
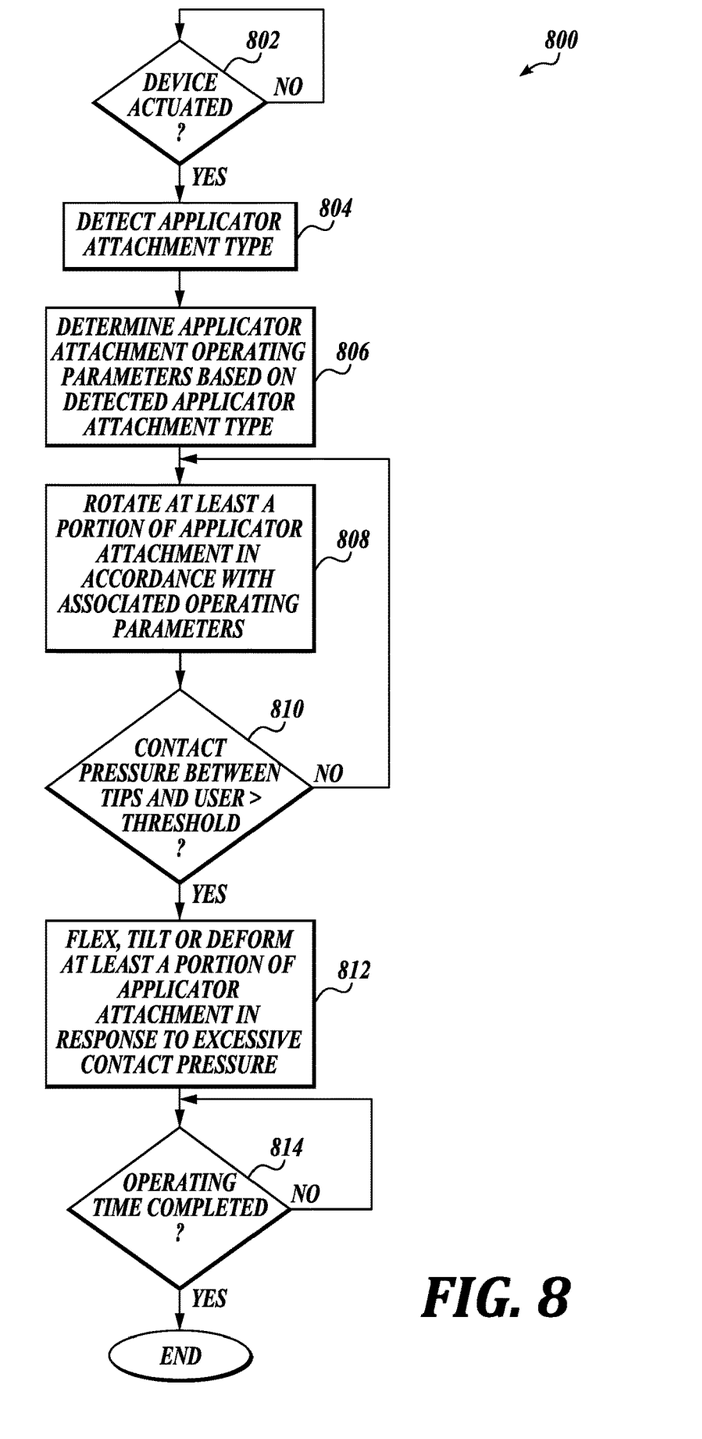
FIG. 8 depicts an example process that may be performed by device, according to some embodiments.

FIG. 8 depicts an example process 800 that may be performed by device 100, according to some embodiments. At block 802, device 100 may be configured to await actuation by the user. The user may push a button on the base 102 to turn the device 100 on. If the device 100 has not been actuated (no branch of block 802), device 100 may be configured to continue waiting for actuation. If the device 100 has been actuated (yes branch of block 802), then base 102 of device 100 may be configured to automatically detect the applicator attachment type associated with the applicator attachment 104 attached to the base 102, at block 804. Base 102 may detect the type identifier mechanism 406 included in the applicator attachment 104. Examples of applicator attachment types include, without limitation, a body brush head, a facial brush head, a pore refining brush head, a sensitive skin brush head, an exfoliating brush head, a massage attachment, an eye area massage applicator attachment, a makeup application attachment, and the like.

Based on the applicator attachment type detected in block 804, base 102 may be configured to determine the particular applicator attachment operating parameters associated with the detected applicator attachment type, at block 806. In some embodiments, a look up table may be accessed which specifies applicator attachment operating parameters associated with respective applicator attachment types. For applicator attachment 104, a first example applicator attachment operating parameter may comprise an operating oscillation at a frequency of around 75 Hz and a second example applicator attachment operating parameter may comprise an application time of two minutes per eye.

Next at block 808, base 102 may be configured to cause the applicator attachment 104 to operate in accordance with the particular applicator attachment operating parameters determined in block 806. At least a portion of the applicator attachment 104 (e.g., first and second portions 200, 202) may be caused to be rotated about the axis 108 at a frequency of around 75 Hz.

During rotation of at least a portion of the applicator attachment 104, if the contact pressure or force between the tips 206 and the user does not exceed a pre-determined threshold (no branch of block 810), then rotation may continue at block 808 in accordance with the particular applicator attachment operating parameters associated with the applicator attachment 104. In some embodiments, the pre-determined threshold may be inherent characteristics of the materials and/or dimensions of the applicator attachment 104. For instance, the pre-determined threshold may be based on the degree of hardness of the bottom portion 402. If the contact pressure/force between the tips 206 and the user at a given point in time is such that no flexing or deformation of the bottom portion 402 occurs, then the threshold may be deemed not to be exceeded.

If the threshold is deemed to be exceeded (yes branch of block 810), then process 800 may proceed to block 812 in which, in response to the current contact pressure/force, at least a portion of the applicator attachment 104 may flex, tilt, deform, and/or the like. In some embodiments, at least the bottom portion 402 may flex or deform in response to the excessive contact pressure/force, which in turn, may cause the top portion 400 and tips 206 to tilt to an angle different from the nominal angle 508.

Such dynamic adjustment of the tips 206 to the user may continue in response to potential changes to the contact pressure/force between the tips 206 and the user caused by changes in surface contour as the tips 206 rotate around the orbital bone, for instance, and/or the user contacting the tips 206 to his/her orbital bone at different amounts of pressure at different times during use of the applicator attachment 104.

If the time for operating the applicator attachment 104 to the user (e.g., one eye) has not completed in accordance with the particular applicator attachment operating parameters (no branch of block 814), then process 800 may return to block 808 to continue the "treatment." Otherwise if the operation time has completed in accordance with the particular applicator attachment operating parameters (yes branch of block 814), then process 800 may end. At this time, the user may move the applicator attachment 104 to another body part (e.g., the orbital bone of the other eye) and process 800 may be repeated.

FIGS. 9A-9C and 10A-10B depict an alternative applicator attachment 900, according to some embodiments. Attachment 900 may include, without limitation, a first portion 902, a second portion 904, and a third portion 906. Second portion 904 may be disposed between the first and third portions 902, 906 along the z-direction of a Cartesian coordinate system. First portion 902 may comprise a plurality of bristles and second portion 904 may comprise a base to seat/hold the plurality of bristles. Third portion 906 may be connected to a side of the second portion 904 that is opposite to a side connected to the first portion 902. Third portion 906 may include a plurality of tabs (similar to tabs 212) to facilitate rotatable attachment of attachment 900 with the base 102. Attachment 900 may also be referred to as flexible brush head attachment.

Figure 9A:
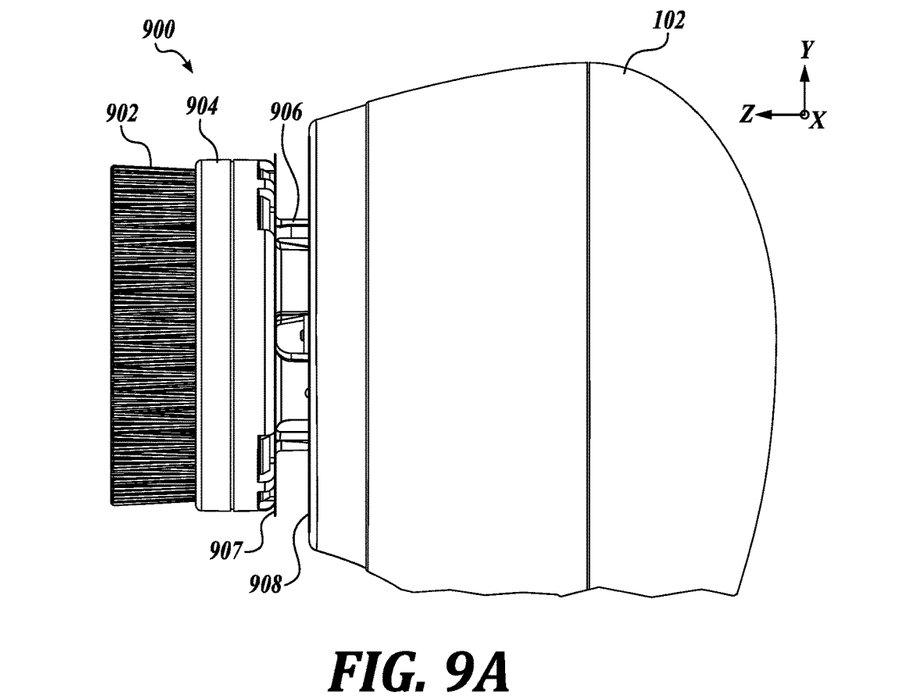
FIGS. 9A-9C depict views of an alternative device, according to some embodiments.
Figure 9B:
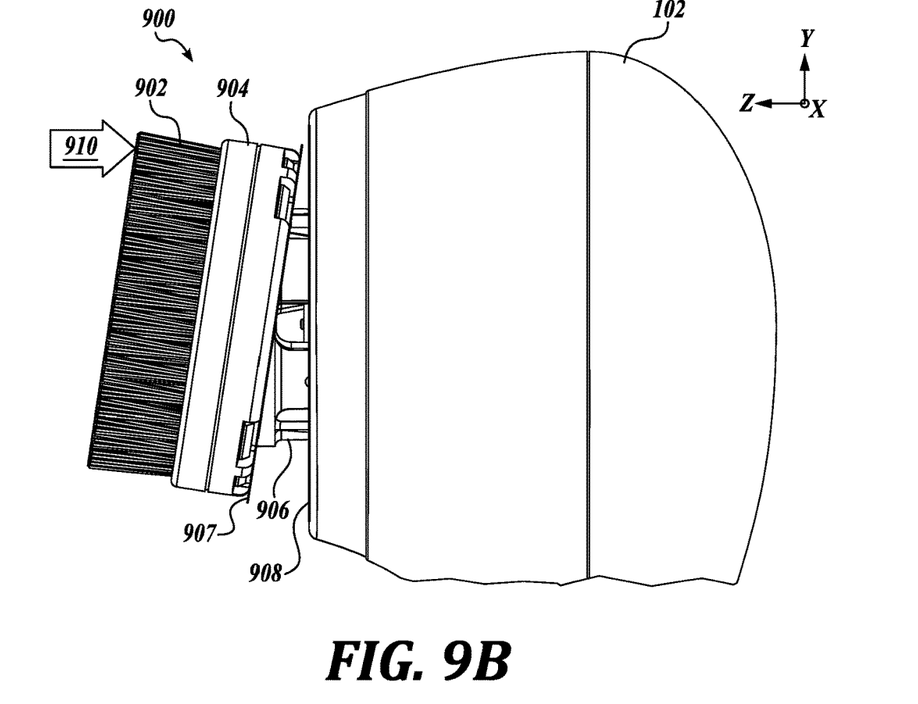
Figure 9C:
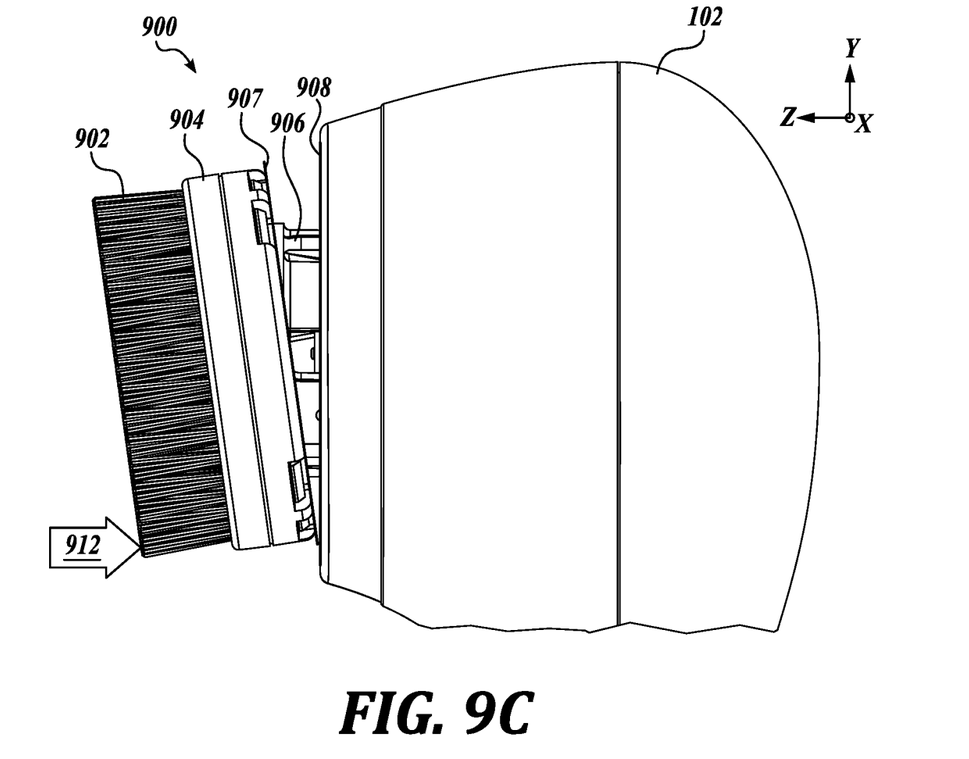

In some embodiments, attachment 900 may rotate about an axis perpendicular to a plane 908 (e.g., rotate about the z-axis of the Cartesian coordinate system) when base 102 has been actuated. Moreover, at least first and second portions 902, 904 may be configured to tilt or flex relative to plane 908 in response to force or pressure applied on the first portion 902. For example, as shown in FIG. 9B, if a force 910 is applied toward the base 102, on a first area of the first portion 902, then first and second portions 902, 904 may tilt, flex, or pivot relative to base 102. A plane 907 associated with the major plane of the first and second portions 902, 904 changes from parallel (see FIG. 9A) to not being parallel (see FIG. 9B) with plane 908. As another example, if a force 912 is applied toward the base 102, on a second area of the first portion 902 different from the first area, then first and second portions 902, 904 may tilt, flex, or pivot relative to base 102 in a direction different from that of FIG. 9B. Plane 907 changes to a non-parallel orientation with the plane 908, as shown in FIG. 9C. First and second portions 902, 904 may tilt/flex in any direction relative to plane 908 (e.g., has 360 degree tilting capability). In some embodiments, at least the first or second area of the first portion 902 may also compress, splay out, or otherwise deform in response to forces 910, 912.

Forces or pressures, such as forces 910 or 912, may occur during application of the attachment 900 on a user's skin surface for cleansing, massaging, product application, and/or the like. While surface skin contact is maintained with the first portion 902, changes in surface skin contour (e.g., nose to cheek transition, lip contour, etc.) and/or changes in user applied contacting pressure of the first portion 902 to the surface skin may cause forces, such as force 910 or 912, to be generated. Due to the tilting or pivot capability of the second portion 904 relative to the third portion 906, in response to applied and/or changes in forces to the first portion 902, attachment 900 may be considered to provide self-compensating force control. The dynamic tilt/pivot capability facilitates maintaining contact between the skin surface and as much of the first portion 902 as possible and/or at a near constant pressure.

Figure 10A:
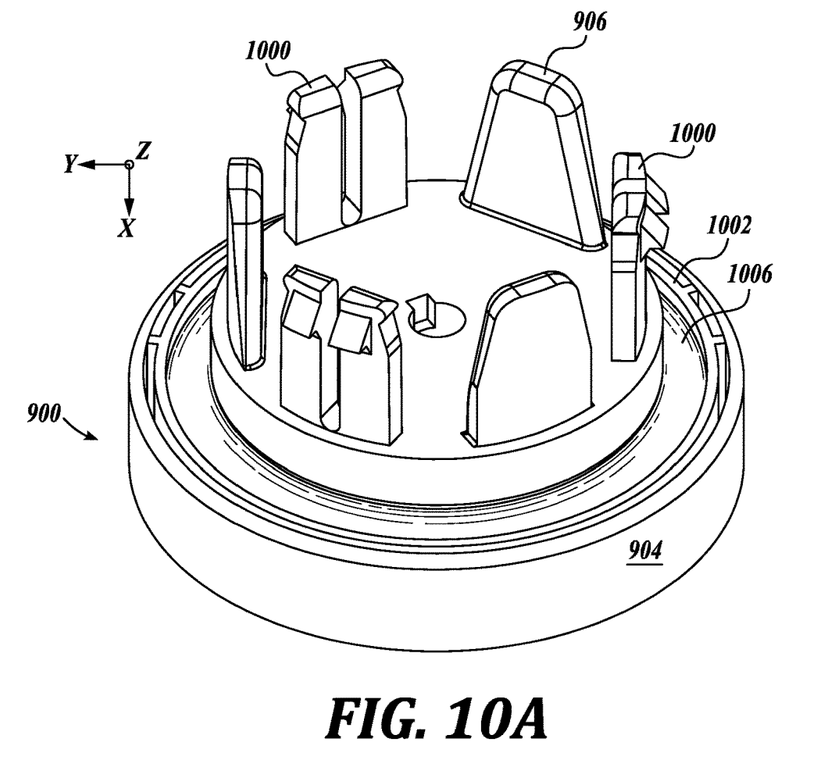
FIGS. 10A-10B depict perspective views of at least a portion of the alternative attachment applicator included in the device of FIGS. 9A-9C, according to some embodiments.
Figure 10B:
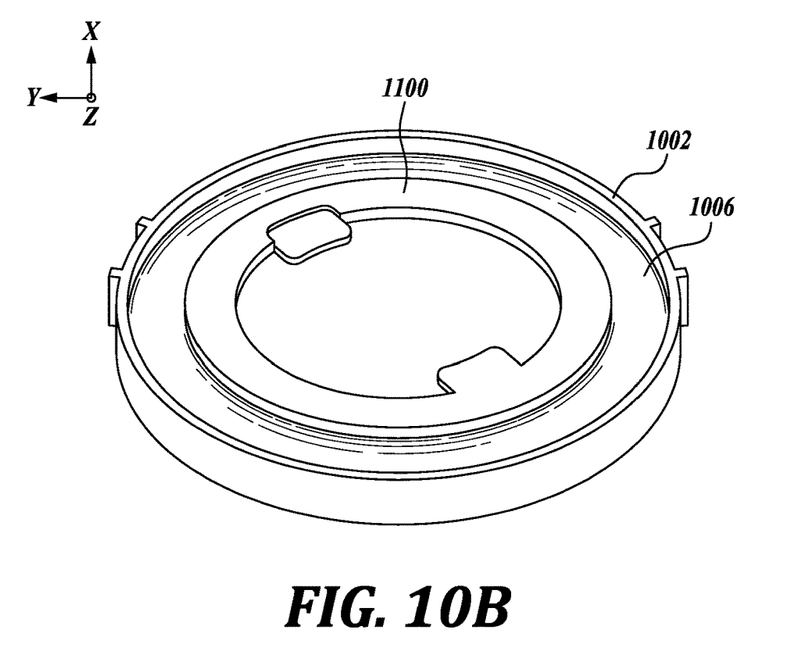

In some embodiments, the tilt/pivot capability may be provided by the inclusion of an elastomeric membrane 1006 included in the attachment 900. FIG. 10A depicts the attachment 900 with the third portion 906 oriented upward. As mentioned above, third portion 906 may include a plurality of tabs 1000 similar to tabs 212 of applicator attachment 104. Concentric with and in between the outer perimeter of the third portion 906 and the inner perimeter of the second portion 904 are first and second rings 1002 and 1100 and the elastomeric membrane 1006. Elastomeric membrane 1006 may be disposed between and in contact with the first and second rings 1002, 1100 in the y-x plane of the Cartesian coordinate system. First ring 1002 may have a larger diameter than the second ring 1100, as shown in FIG. 10B. FIG. 10B depicts the first and second rings 1002, 1100 and the elastomeric membrane 1006 flipped upside down from the orientation in FIG. 10A. In other words, the underside of the first and second rings 1002, 1100 and the elastomeric membrane 1006 shown in FIG. 10A is shown in FIG. 10B.

Elastomeric membrane 1006 may be configured to occupy the space between the first and second rings 1002, 1100 (also referred to as outer and inner rings) and may also extend in thickness along the x-direction between the first and second rings 1002, 1100 (e.g., elastomeric membrane 1006 may have an inner tube-like shape). In some embodiments, force or pressure applied to the first portion 902 above a certain threshold may cause a portion of the elastomeric membrane 1006 proximate the location of the applied force/pressure to deform or indent, thereby creating space for the area of the first and second portions 902, 904 collinear with the portion of the elastomeric membrane 1006 deformed to tilt toward the base 102 and the directly opposite area of the first and second portions 902, 904 to tilt away from the base 102 due to the displaced material of the elastomeric membrane 1006 from the deformation redistributing toward or in the space collinear with the directly opposite area of the first and second portions 902, 904.

In this manner, selective deformation of the elastomeric membrane 1006 (also referred to as a flexible membrane, elastomeric diaphragm, or the like) permits the first portion 902 (the brush bristles) to tilt side-to-side in any of 360 degrees circumference and/or for the whole of first and second portions 902, 904 to have translation movement in a direction normal to the major surface of the first portion 902. Elastomeric membrane 1006 may be rigid in the twisting or rotating direction of the device 100. The (high) rigidity in the twisting/rotating direction enables the oscillating power of the base 102 to effectively couple to the first ring 1002 (which is also rigid) and structures attached to the first ring 1002 (e.g., second portion 904 attaches to both the first ring 1002 and the first portion 902).

The relatively high hoop strength of the first ring 1002, shear strength of the elastomeric membrane 1006, and/or the ridges along the outer side of the first ring 1002 (also referred to as keyed interfaces) facilitate minimizing loss of energy provided by the base 102. In addition, the molded joining/connection of the first, second, and third portions 902, 904, 906 enables the applicator 900 overall to operate at resonance frequency and associated inertia, resembling operation of applicators without the flex capability.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

We claim:

1. An apparatus comprising:
    an applicator that is to contact skin surface; and
    a base connectable or detachable from the applicator, wherein, if the applicator is connected to the base, the base is to cause the applicator to rotate about a rotation axis in a particular oscillation pattern,
    wherein the applicator comprises first, second, and third portions, and the second portion is disposed between and connected to the first and third portions along the rotation axis of the applicator,
    wherein the first portion comprises an outwardly curved disc with at least one tip protruding from a major surface of the first portion, the second portion comprises an elastomeric material configured to flex proportionately in response to respective contact pressure on the at least one tip with the skin surface during rotation of the first portion, and the first portion is to tilt in a plane different from a rotation plane associated with the rotation axis in accordance with the flexing of the second portion.

2. The apparatus of claim 1, wherein a shape of the second portion is to cause a first edge of the first portion to be closer to the third portion than a second edge, directly opposite the first edge, of the first portion to the third portion.

3. The apparatus of claim 1, wherein the at least one tip is located closer to an edge than a middle of the major surface.

4. The apparatus of claim 1, wherein the third portion is configured to connect to the base, and wherein the third portion is configured to cause the first and second portions to rotate about the rotation axis.

5. The apparatus of claim 1, wherein the at least one tip comprises two tips located proximate to each other.

6. The apparatus of claim 1, wherein the at least one tip comprises a material having a thermal diffusivity of 50 to 100 millimeter square per second ($mm^2/s$).

7. The apparatus of claim 1, wherein the elastomeric material comprises a material having a durometer of 25 to 45 Shore A.

8. An apparatus comprising:
a first portion comprising a base and at least one tip protruding from a first major surface of the base;
a second portion comprising an elastomeric material configured to deform in response to a particular amount of contact pressure between the at least one tip and skin surface; and
a third portion configured to be detachably connectable to a device, wherein the device is to cause the first, second, and third portions to oscillate about a rotation axis perpendicular to a second major surface of the third portion,
wherein the second portion is disposed between and connected to the first and third portions, and the first portion is configured to tilt in a plane different from a rotation plane associated with the rotation axis based on the deformation of the second portion.

9. The apparatus of claim 8, wherein the at least one tip is located closer to an edge than a middle of the first major surface of the base.

10. The apparatus of claim 8, wherein the at least one tip comprises two tips located proximate to each other.

11. The apparatus of claim 8, wherein the at least one tip comprises a material having a thermal diffusivity of 50 to 100 millimeter square per second ($mm^2/s$).

12. The apparatus of claim 8, wherein the elastomeric material comprises a material having a durometer of 25 to 45 Shore A.

13. The apparatus of claim 8, wherein one or both of contact and constant pressure is maintained between the at least one tip and the skin surface by deformation of the second portion in response to the particular amount of contact pressure between the at least one tip and the skin surface.

14. The apparatus of claim 8, wherein a shape of the second portion is to cause a first edge of the first portion to be closer to the third portion than a second edge, directly opposite the first edge, of the first portion to the third portion.

15. The apparatus of claim 14, wherein a tilt angle of the first portion may be approximately 9 degrees in the absence of deformation of the second portion.

16. The apparatus of claim 8, further comprising an inertial mass included between the second and third portions, wherein the inertial mass is configured to cause the first, second, and third portions to oscillate at approximately 75 Hertz or a frequency lower than a nominal operating frequency of the device.

17. A method comprising:
causing to rotate a skin surface contacting unit about a rotation axis in accordance with a particular oscillation pattern;
in response to a contact pressure between a skin surface and a tip disposed on at least a first portion of the skin surface contacting unit exceeding a threshold, deforming a second portion of the skin surface contacting applicator; and
while the skin surface contacting unit is in rotation about the rotation axis, changing an angle of the first portion of the skin surface contacting unit to be in a plane different from a rotation plane associated with the rotation axis based on the deformation of the second portion.

18. The method of claim 17, wherein deforming the second portion occurs in accordance with a flexible material comprising the second portion having a durometer of 25 to 45 Shore A.

19. The method of claim 17, wherein the first portion includes a plurality of protrusions located proximate to each other and having a thermal diffusivity of 50 to 100 millimeter square per second ($mm^2/s$), and wherein the plurality of protrusions has contact pressure with the skin surface.

20. The method of claim 17, wherein the first portion includes a plurality of bristles, wherein at least one bristle of the plurality of bristles has contact pressure with the skin surface, and wherein the second portion comprises an elastomeric membrane disposed on a side of the plurality of bristles opposite a side in contact pressure with the skin surface.

* * * * *